United States Patent [19]

Howard et al.

[11] 4,427,623
[45] Jan. 24, 1984

[54] AUTOMATIC FUEL TRANSFER APPARATUS AND METHOD

[75] Inventors: Norman C. Howard, Danville; Kenneth R. Miller, San Jose; Matthew C. Lussier, Santa Clara, all of Calif.

[73] Assignee: General Electric Company, San Jose, Calif.

[21] Appl. No.: 287,102

[22] Filed: Jul. 27, 1981

[51] Int. Cl.³ .................. G21C 19/20; G21C 17/00
[52] U.S. Cl. .................. 376/263; 376/258; 376/271
[58] Field of Search .......... 376/263, 271, 258; 414/273; 212/98

[56] References Cited

U.S. PATENT DOCUMENTS

| 3,072,554 | 1/1963 | Madsen | 376/263 |
|---|---|---|---|
| 3,431,170 | 3/1969 | Lass et al. | 376/446 |
| 3,734,310 | 5/1973 | Miller | 414/273 |
| 3,817,398 | 6/1974 | Jones | 212/98 |
| 3,863,770 | 2/1975 | Shallenburger et al. | 376/271 |
| 3,889,169 | 6/1975 | Hirshman et al. | 414/273 |
| 3,904,048 | 9/1975 | Van Santen et al. | 376/271 |
| 3,927,773 | 12/1975 | Bright | 414/273 |
| 4,053,356 | 10/1977 | Brammer, Jr. | 376/263 |

FOREIGN PATENT DOCUMENTS

| 55-11409 | 1/1980 | Japan | 414/273 |
|---|---|---|---|
| 640915 | 9/1979 | | 414/273 |

OTHER PUBLICATIONS

Hewlett Packard-3850A Industrial Distance Meter, Technical Data Jun. 1980.
Hewlett Packard Journal, Jun. 1980, pp. 11–24, Industrial Distance Meter Applications, Smith et al.

*Primary Examiner*—Sal Cangialosi
*Attorney, Agent, or Firm*—Ivor J. James, Jr.; Samuel E. Turner; Raymond G. Simkins

[57] ABSTRACT

In a nucler reactor containment structure, a fuel transfer arrangement including a bridge, trolley, and grapple, each of the latter having a position sensor mounted thereon, and control means for determining the position of bridge, trolley, and grapple in response to signals from said position sensors, whereby fuel assemblies may be transferred between locations in the containment structure.

2 Claims, 16 Drawing Figures

NOTE: THE BRIDGE 7 LIES BETWEEN 15' AND 15". THETA ($\theta$) IS THE SKEW ANGLE, WHICH DEPENDS ON A DIFFERENCE $|y_1 - y_2|$. THE GRAPPLE 8 IS AT $(x, y)$ AND SEEKS DESTINATION $(a, b)$.

TABLE OF FLOW CHARTS

| CHART | ROUTINE OR SUBROUTINE | ACRONYM MEANING |
|---|---|---|
| A | START | BEGINNING OF PROGRAM |
| B | $MGh_t$ | MOVE GRAPPLE TO TRAVEL HEIGHT |
| C | $MTC_L$ | MOVE TROLLEY TO CENTERLINE |
| D | MBD | MOVE BRIDGE TO DESTINATION |
| E | MTD | MOVE TROLLEY TO DESTINATION |
| F | $MGh_f$ | MOVE GRAPPLE TO FINAL HEIGHT |
| G | DBD | DETERMINE BRIDGE DESTINATION |
| H | DTD | DETERMINE TROLLEY DESTINATION |

*Fig. 8*

DRAWING OF A PREFERRED EMBODIMENT

The invention will be better understood from the accompanying description of the preferred embodiment taken in conjunction with the accompanying drawing, wherein:

FIG. 8 is a table that describes the flow charts in subsequent figures.

DESCRIPTION OF THE PREFERRED EMBODIMENT

Figure 1:
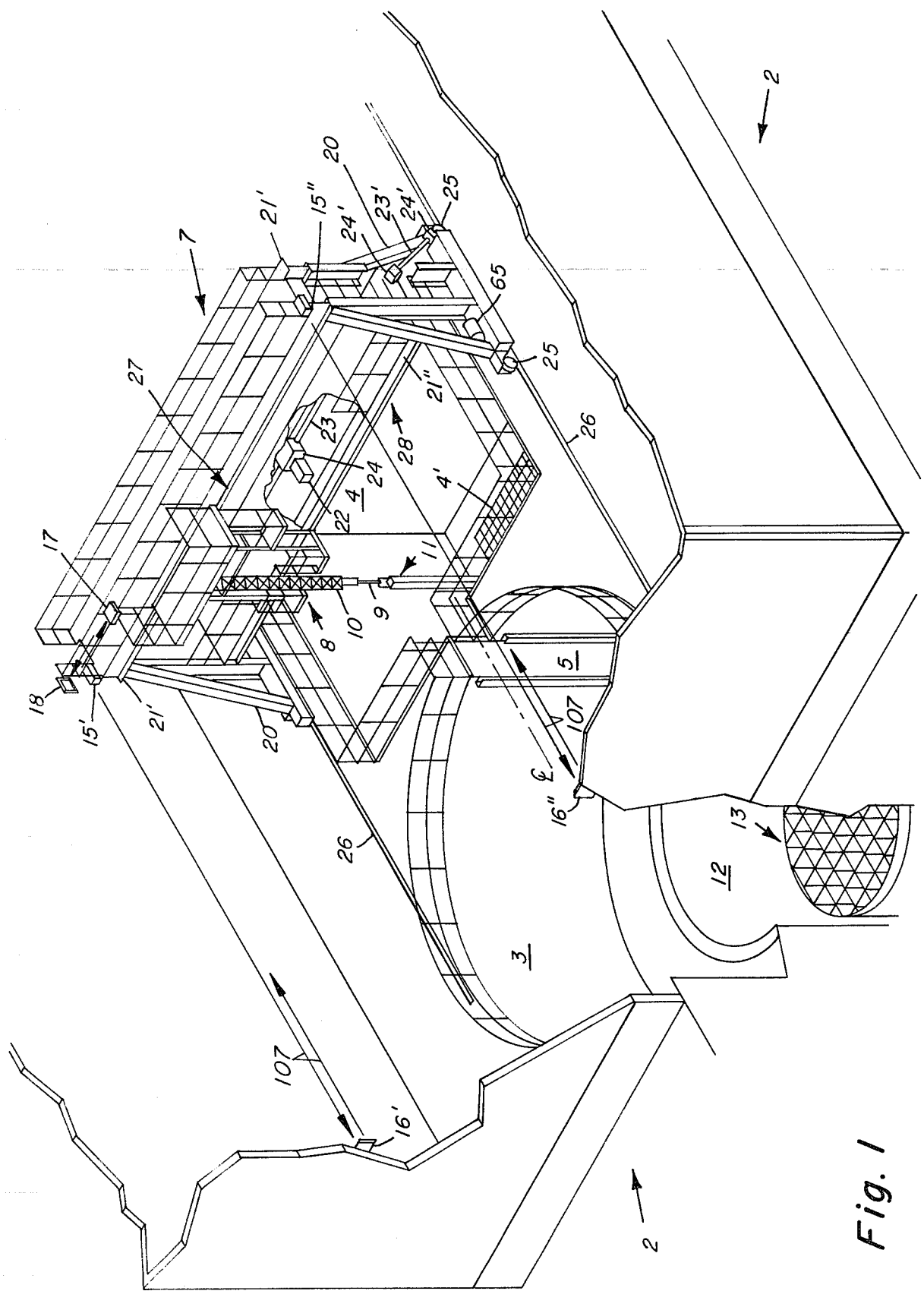
FIG. 1 illustrates the interior of a reactor containment building including a reactor storage pool, a pressure vessel contaning the reactor core, and a refueling platform bridge.

Illustrated in FIG. 1 is a reactor containment building 2 including a wetwell 3, a fuel storage pool 4 including racks 4' for storing fuel bundles, and a channel 5 therebetween bisected by a centerline $C_L$. Additionally shown is a fuel transfer platform including a bridge 7, trolley 8, and a hoist or grapple 9 set forth in greater detail in FIGS. 2 and 3. The grapple 9 is mounted at the end of a mast 10 for lifting and transferring fuel bundles as indicated at 11 and further explained hereinafter.

The wetwell 3 holds a pressure vessel 12 containing a reactor core 13. The channel 5 is sealed with gates (not shown), and during operation the wetwell 3 is dry and evacuated of water. However, during an outage for transferring fuel between the core 13 and the fuel storage pool 4, the wetwell 3 is filled with demineralized, deionized water, which shields operating personnel from undue radiation. The channel 5 is opened by removing the sealing gates and permitting water to flow freely between the fuel storage pool 4 and the wetwell 3.

Bridge position sensors are shown at 15' and 15", optically cooperating with respective reflectors 16' and 16" which are suitably mounted on a selected reference wall of the containment building 2. Additionally, a single trolley position sensor 17 is shown optically cooperating with a reflector 18. A grapple position sensor 19 is shown within trolley 8 in FIG. 2 for measuring the vertical level of the grapple 9 in FIG. 3 at the lower end of the mast 10. Two bridge position sensors are required, if bridge skew or misalignment is to be monitored. To operate the apparatus of this invention without considering skew, however, only a single bridge position sensor is needed.

The bridge as shown in FIG. 1 is a sturdy cross-braced structure including end-trucks 20 joined by upper beams 21' and lower beams 21". A bridge motor 22 suitably coupled to a drive shaft 23 by a reduction gear 24 propels at least one of wheels 25 in each end-truck through further reduction gears 24' and connecting shafts 23'. The wheels 25 are supported on rails 26 mounted on the floor of the containment building 2.

Figure 2:
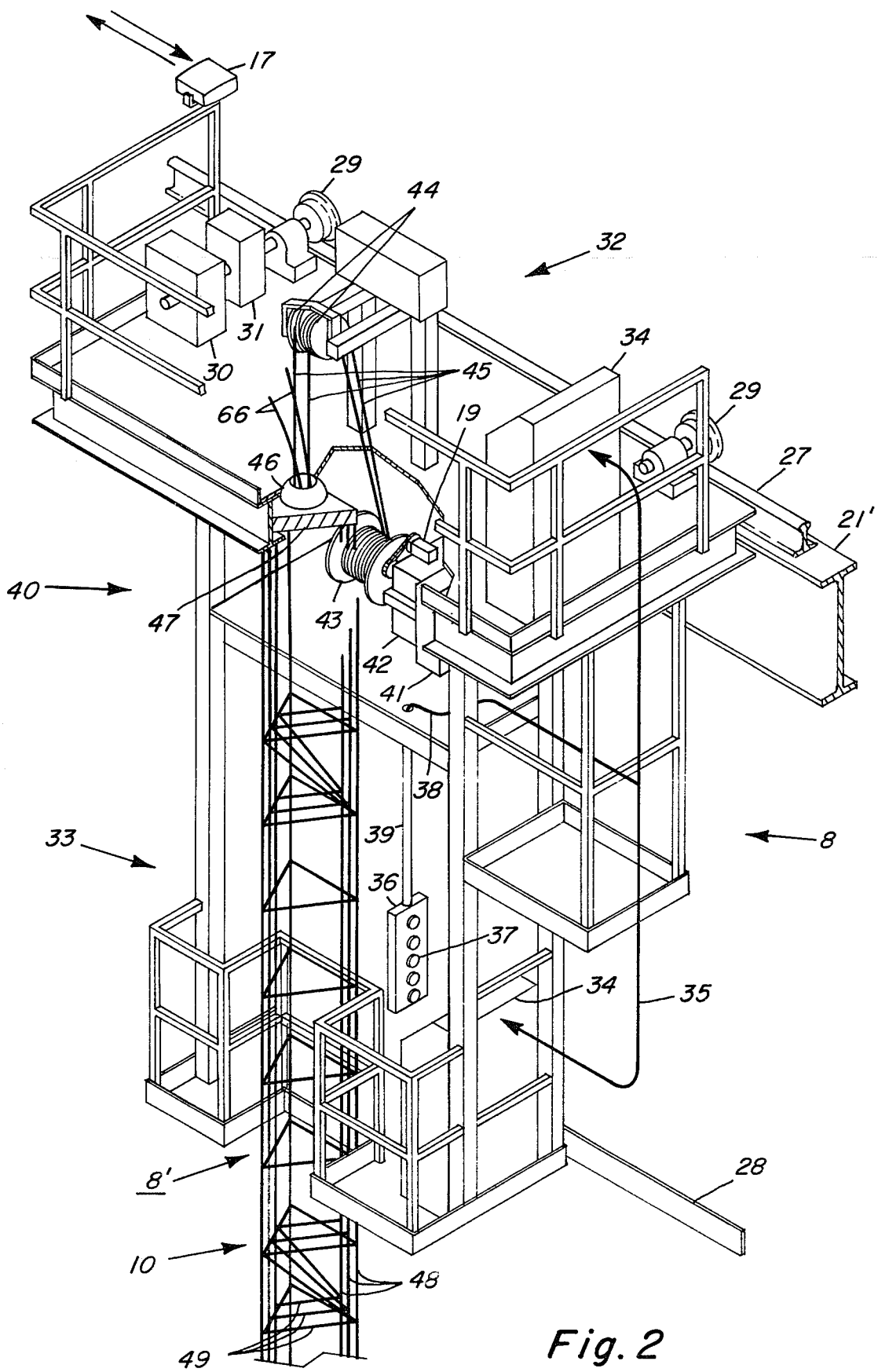
FIG. 2 is an isometric drawing of the trolley of the refueling platform.

Suitably mounted on the bridge 7 are upper and side rails, respectively 27 and 28 in FIG. 2, which support the trolley 8 as it traverses the length of the bridge 7 on wheels 29, at least one of which is suitably coupled to a trolley motor 30 through a reduction gear 31. Alternatively, the trolley 8 is mounted on the bridge between beams 21'. The trolley motor 30 is suitably mounted on the floor of an upper level 32 of the trolley 8. The lower level or operator's cab is indicated by reference numeral 33. Two process controller terminals 34, suitably coupled by cables or buses 35, are shared by the upper and lower levels 32, 33. Also on the lower level 33 is a console 36 for holding various indicators and switches, including a mode switch 37 to be discussed hereinafter. Suitable electrical connections to the computer system from console 36 are made by a cable 38 through conduit 39.

Principally mounted on a middle level 40 of the trolley 8 are a hoist motor 41, a reduction gear 42, a drum 43, sheaves 44, a pair of cables 45, and the grapple position sensor 19, which measure the turns of drum 43. The mast 10 extends through an opening 8' in the outer side of the trolley 8 and downward below the trolley 8 into the water below.

Figure 3:
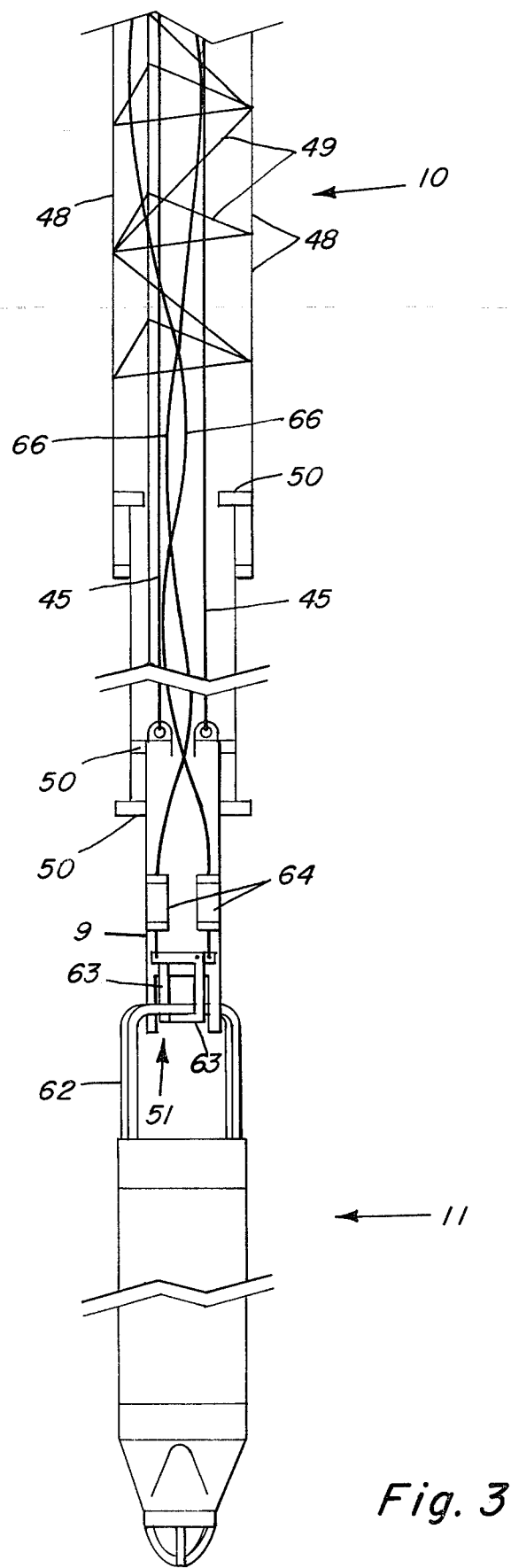
FIG. 3 shows the grapple coupled to a fuel bundle.

The mast 10 is suitably pivotally shock mounted on the floor of the upper level 32 of the trolley 8 and is supported for example by an annular thrust bearing 46 and gimbles 47. The mast 10 includes four stages, which are suitably nested within one another. The lowest stage or grapple 9 is also the innermost of the nested stages. Each of the stages includes an assembly of vertical tubes 48 and traversing struts 49 holding the tubes 48 in a spaced relationship to one another. The downward range of motion of each stage relative to the stage in which it is immediately nested is limited by suitable stops and catches 50, as shown in FIG. 3.

Receiving bays 51 defined in grapple 9 couple with a bail portion 62 of the fuel bundle 11. Hooks 63 suitably pin mounted in the grapple 9 fit under the bail 62 from both sides under the control of positively acting penumatic cylinders 64 suitably mounted in the grapple 9. They are supplied with air from a compressor 65 mounted in an end-truck 20 of the bridge 7 by two air lines 66 alternately acting as input and exhaust lines.

The air lines 66 and the cables 45 travel within the hollow interior of the mast 10. The air lines 66 lead to the grapple 9 and are suitably coupled to appropriate ports in each pneumatic cylinder 64. The passage of air through these lines may be controlled from the console 36 by a solenoid valve (not shown). The cables 45 are made fast to a suitable portion of the grapple 9 and extend through the annular thrust bearing 46 and gimbles 47 and the deck of the upper level 32 of the trolley 8 over sheaves 44 and then down again through the deck of the upper level 32 to the drum 43 which winds and unwinds the cables 45 to respectively lift and lower the grapple 9, loaded or unloaded with a fuel bundle 11 as the case may be.

Figure 4:
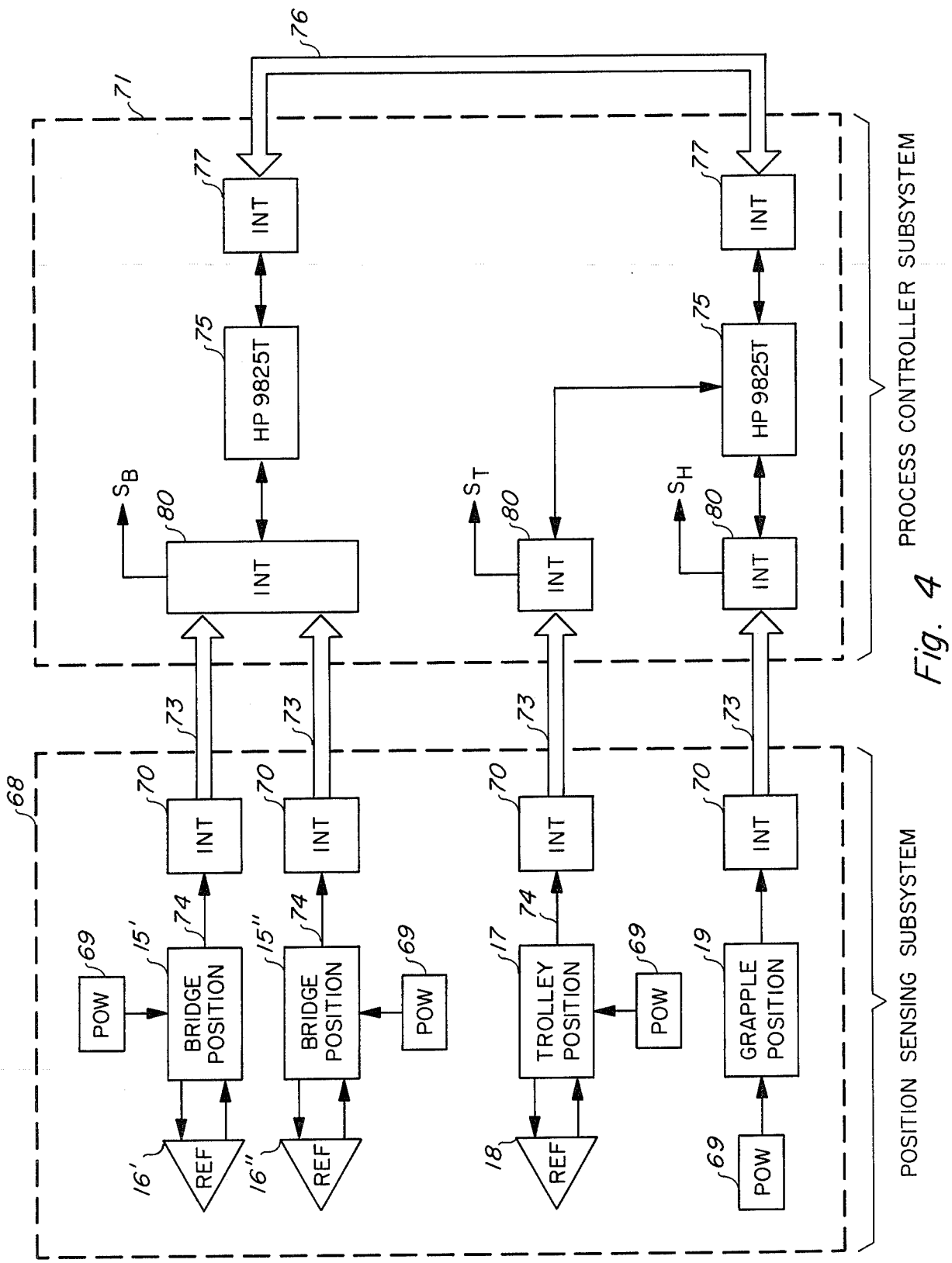
FIGS. 4 and 5 are block diagrams of the position sensing, process, and motor controller subsystems of the automatic fuel transfer apparatus.

Turning now to FIG. 4, the bridge position sensors 15' and 15" are shown in cooperative engagement with respective reflectors 16', 16" in what will be referred to as the "position sensing subsystem 68". Additionally, included in the subsystem is the trolley position sensor 17 which cooperates with reflector 18. Also, the grapple position sensor 19 is shown. Each of these position sensors is provided with a suitable power supply 69, and

AUTOMATIC FUEL TRANSFER APPARATUS AND METHOD

BACKGROUND

Moving fuel bundles between locations in a nuclear facility containment building is often subject to a minimum critical path time schedule, which determines the length of time a nuclear power plant is unavailable for consumer energy production.

By way of background, nuclear reactors subject to such a movement of fuel bundles are discussed in "Nuclear Power Engineering" a work by M. M. El-Wakil, which was published by McGraw-Hill in 1962. The fuel bundles themselves are described in useful detail in U.S. Pat. No. 3,431,170, which is incorporated herein.

The nuclear reactor is but one element of a larger facility which will be described hereinafter. It should also be noted at this point that the movement of fuel referred to above may involve refueling the nuclear reactor or the initial fuel loading of the reactor or it may even involve the movement of fuel within the reactor facility which is not related directly to loading or unloading fuel in the reactor itself at all. Furthermore, it is notable that there is a movement of reactor facility equipment in "picking up" a fuel bundle which is very closely related to the movement of equipment involved in moving the fuel bundle after it has been "picked up." These ancillary equipment movements are considered to be included in the penumbra of activities falling under the phrase "moving the fuel bundles."

At present, nuclear fuel in the form of fuel bundles is moved by an operator manually operating controls in an operators cab in the trolley of a fuel transfer platform within the containment building or structure of a nuclear reactor facility. The fuel transfer platform includes a bridge spanning two rails in the floor of the containment building, the trolley just mentioned, and a hoist/grapple arrangement to be further discussed. This arrangement actually lifts and holds the fuel bundle preliminary to and during movement from one part of the facility to another.

The speed and predictability of the movement of fuel understandably varies with the skills and the discipline of the operator. For some portions of the transfer of fuel procedure his skill and judgement are indispensable. For other more routine and repetitive tasks, he would gladly delegate functional responsibility to a more automatic system. The instant invention to be described herein involves such a system.

In accordance therewith, an object of the instant invention is to reduce the minimum critical path time of refueling in nuclear facilities.

Furthermore, an object of the instant invention is to reduce the time of movement of a nuclear fuel bundle being transferred between locations in the containment structure of a nuclear facility.

Another object of the instant invention is to reduce overall facility outage times related to moving nuclear fuel between locations in a reactor core and fuel storage pool.

An additional object of the instant invention is to reduce and make more predictable the pick-up and transfer times of nuclear fuel bundles within the containment of a nuclear reactor facility.

Yet another object of the instant invention is to effect all movements in a critically damped fashion when repositioning a loaded or unloaded refueling platform toward a selected hoist/grapple destination.

Even another object of the instant invention is to automate a portion of the fuel handling procedure in nuclear facilities.

A final listed object of the instant invention is to reduce the consumer cost of nuclear facility plant outages.

SUMMARY OF THE INVENTION

These and other objects of the invention are achieved by the automatic fuel transfer apparatus and method described herein.

The apparatus includes position sensors strategically placed at various locations of the refueling platform including the bridge, the trolley, and the hoist/grapple arrangement, for monitoring the position of the bridge in the containment building, the position of the trolley on the bridge, and the height of the grapple in terms of the turns of the hoist about a drum for winding cable. The grapple may be loaded with a fuel bundle coupled thereto, or it may be unloaded, as it hangs at the end of a telescoping hoist pivotally connected to the trolley above.

The position sensors for the bridge and trolley optically cooperate with reflectors located elsewhere at selected reference positions. The output of each of the position sensors, including the grapple position sensor provides digital position indicative information. This information is processed by a process controller, which is part of the overall fuel transfer apparatus.

Thereby produced are control signals for each of a number of motors effecting among other things the positioning of bridge, trolley, and grapple. These signals are converted into analog form, transferred to an appropriate motor controller, and provided in altered form to the motors governing the position and velocity of movement of the bridge, trolley, and grapple.

The process controller operates according to predetermined instructions developed in accordance with a flow diagram including numerous steps in the form of various subroutines. These subroutines repeatedly evaluate the safety of making a position change in trolley, bridge, or grapple location by comparing the measured position of these components to a safe-map stored in memory.

Broadly, the transfer apparatus adjusts the grapple to a selected transfer height, determines whether the present position of the grapple and a selected destination is in a common region of the reactor facility, moves the grapple to a predefined center line (if not common) moves the bridge to destination, moves the trolley to destination, and adjusts the grapple to a selected final height.

In one embodiment, the invention includes two position sensors on the bridge. Because of the distance between the ends of the bridge and the rails mounting the bridge, it is not uncommon that some skewing or misalignment will occur during movement of the bridge toward its destination. The process of operating this apparatus accordingly corrects for the skew in terms of modified destination coordinates. This is particularly important, since skew results in the movement of the trolley no longer coinciding with the defined x-coordinate direction.

It turns out that if $y_1 > y_2$, $e_y$ is positive; if $y_2 > y_1$, $e_y$ is negative.

Figure 6:
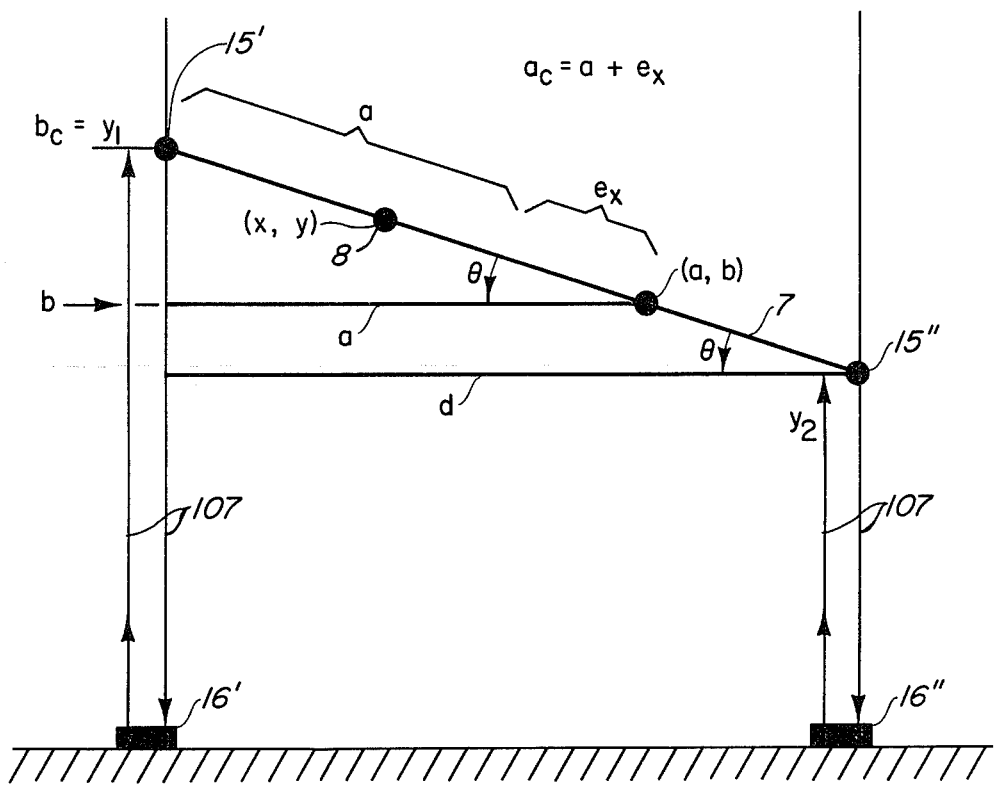
FIG. 6 is a diagram illustrating how to account for skew as the refueling platform progresses toward its input destination.

Once the bridge 7 reaches "b" (and the portion of the bridge holding position meter 15' is at $b_c$), the trolley 8 will begin to seek out its destination "a". However, because of the skew of the bridge, the trolley 8 must travel an additional distance $e_x$ beyond "a" to reach corrected destination "$a_c$". The additional distance $e_x$, according to an analysis of FIG. 6 is defined by the following relationship:

$$e_x = (a)(\sec(\theta) - 1). \qquad (5)$$

Figure 5:
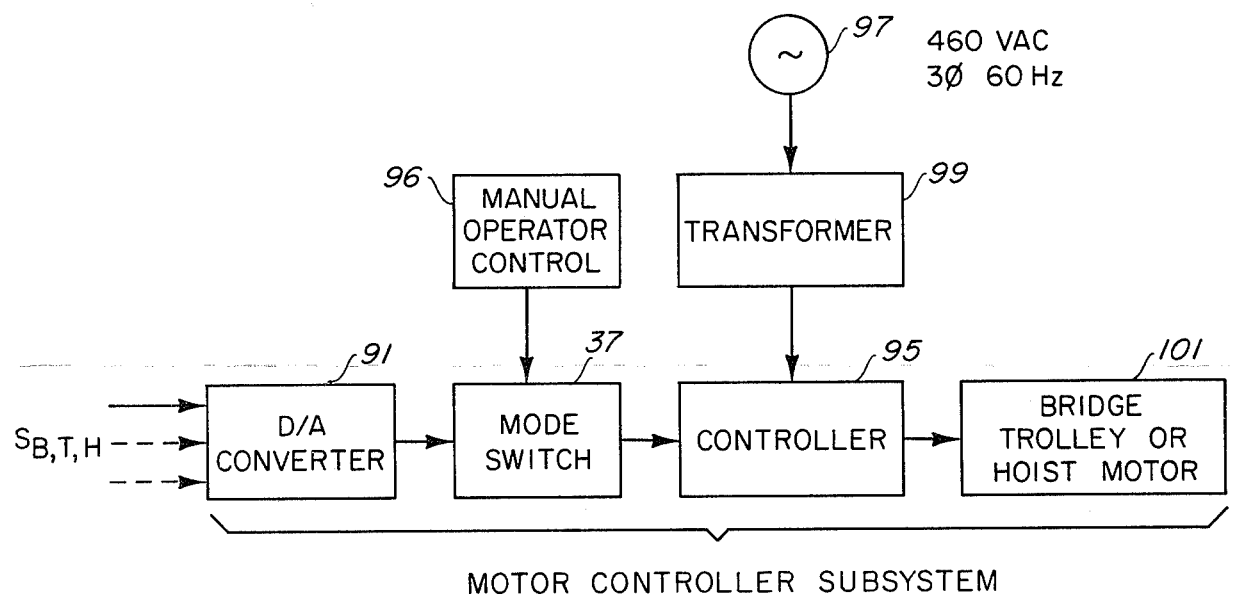

Therefore, the motor controller subsystem in FIG. 5 drives the trolley an additional distance $e_x$ according to relationship (5) in order to actually reach destination (a, b). To move the refueling platform to a destination (a, b), the steps or procedures outlined in flow charts A through H are observed.

Standard block notation is employed in these charts. For example, square block 203 indicates a computational or logical routine. The horizontally elongated hexagon 204 represents a subroutine having the name, which in this case is the acronym MGh$_t$, indicated beneath the horizontal line within the block. The oblong block at 200 simply includes the name of the routine indicated and serves as a primary entry point for the program.

The program begins at "START" 200, when the operator manually presses mode switch 37 on the console 36 in the cab 33 of the trolley 8. In block 202, the operator inputs selected values of the grapple travel height $h_t$, final grapple height after transfer $h_f$, the separation d between bridge position sensors 15' and 15'', selected bridge 7 and trolley 8 destination codes, a lookup table to convert the input destination codes into destination coordinates (a, b), and a safe map defining bounds on regions which must be avoided to prevent collision with the sides of the wetwell, the sides of the fuel storage pool, and other obstructions.

In block 203, the process controller enters the lookup table mentioned and finds destination values (a, b) based upon the selected bridge and trolley destination codes input at terminal 34.

Blocks 204 through 216 are to be further developed in the discussion below on charts B through F. These various subroutines move the grapple 9 to its input transfer height $h_t$ (block 204); and the trolley 8 to the centerline $C_L$ shown in FIG. 1 (block 208); move the bridge to its destination "b" (block 212); the trolley to its destination "a" (block 214); and the grapple to final height "$h_f$" (block 216). Of course, there is no need to move the trolley 8 to the centerline $C_L$, if grapple 9 and the destination (a, b) are in a common region—that is, on the same side of the channel 5. Thus, decision block 206 permits block 208 to be bypassed along path 209.

It should additionally be noted that although the preferred process of this embodiment calls for various operations to be performed sequentially, that is block-by-block, it is foreseen that many of the operations defined by these subroutines can conveniently be combined for simultaneous performance.

Each chart B through F represents a single subroutine block of chart A, relating to the movement of either the hoist, trolley, or bridge.

In view of the similarity between the routines in charts B through F, the following table relates analogous block reference numbers to the similar function performed:

TABLE I

| Flow Chart | | | | | Function Performed |
|---|---|---|---|---|---|
| B | C | D | E | F | |
| 220 | 240 | 260 | 280 | 300 | start subroutine |
| — | — | 262 | 282 | — | call other subroutine |
| 222 | 242 | 263 | 283 | 301 | input present position |
| 224 | 244 | 264 | 284 | 302 | distance to destination |
| 225 | 245 | 265 | 286 | 303 | tolerance permitted |
| 226 | 248 | 266 | 288 | 304 | difference tolerable |
| 227 | 249 | 267 | 290 | 305 | safe to move |
| 228 | 250 | 268 | 292 | 306 | return to calling routine |
| 230 | 252 | 269 | 294 | 307 | stop program |
| 232 | 254 | 270 | 296 | 308 | move incrementally |
| 233 | 255 | 271 | 297 | 309 | loop back |

Furthermore, the table below sets forth suggested range of tolerance values $T_X$, $T_Y$, $T_Z$, and $T_{CL}$ to be discussed hereinafter:

TABLE II

| Term | Value |
|---|---|
| $T_X$ | 0.25" |
| $T_Y$ | 0.25" |
| $T_Z$ | 2.00" |
| $T_{CL}$ | 2.00" |

Figure 9:
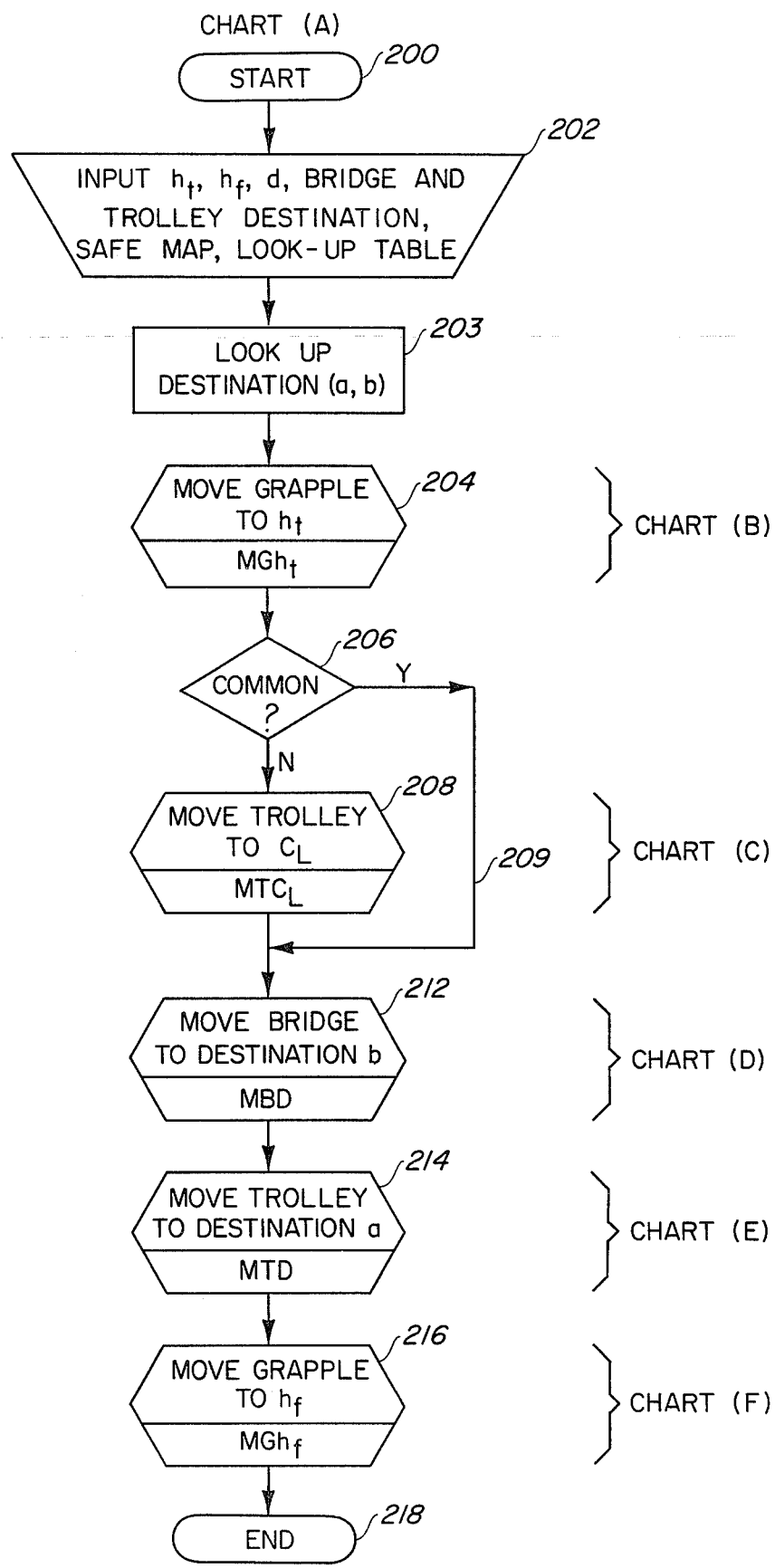
FIGS. 9 through 16 are flow charts of the process of moving the bridge, trolley, and grapple.
Figure 10:
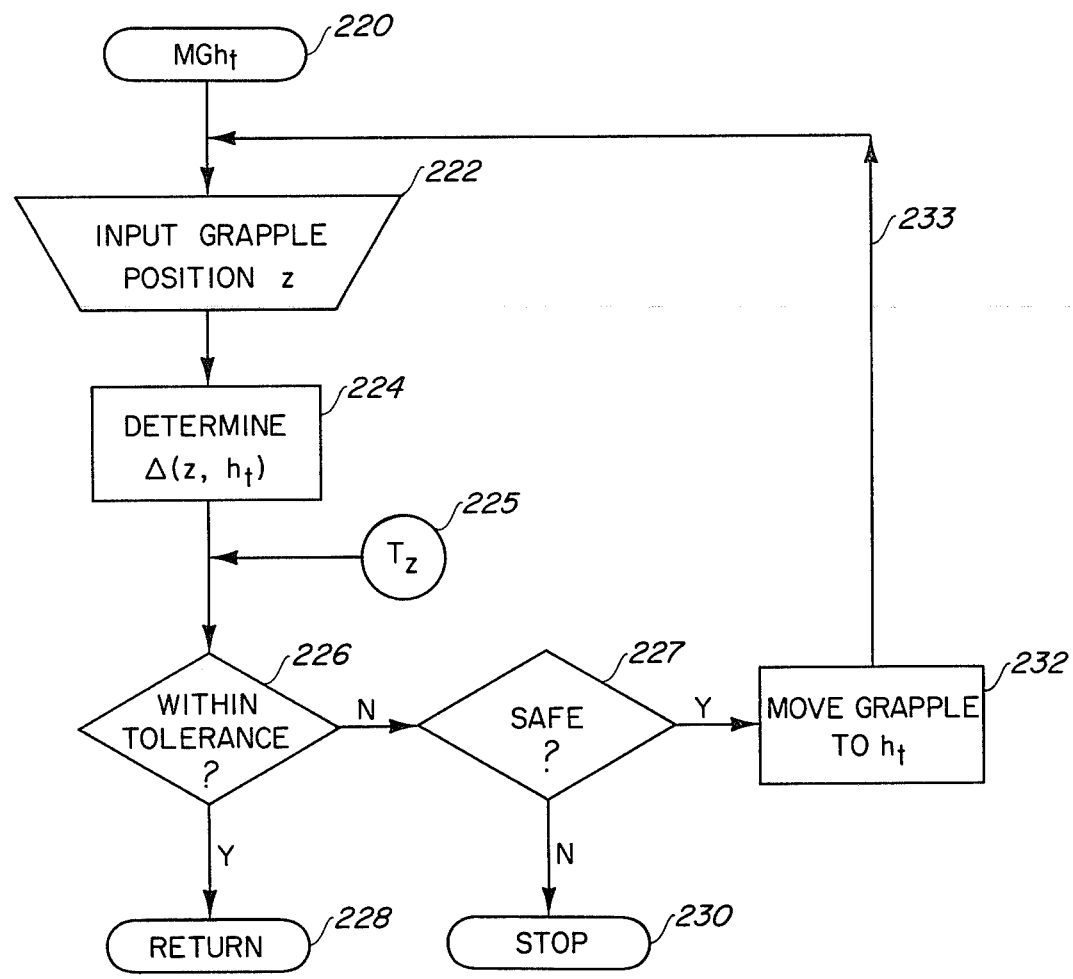
Figure 11:
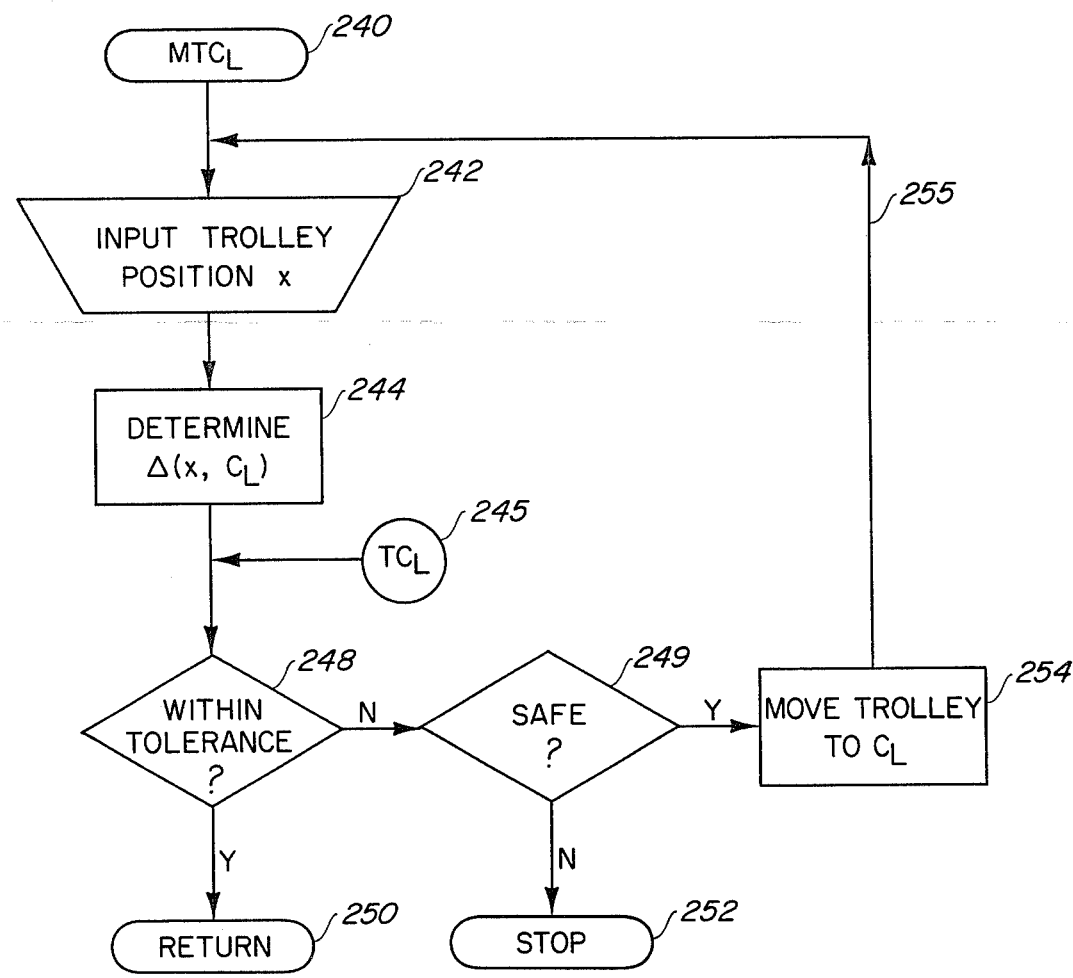

Turning now to charts B and F, both will be considered together because of their close similarity. The acronym MGh$_t$ at the top of chart B describes the function of the subroutine: to move or adjust the grapple to its selected travel height $h_t$, and in chart F, HGh$_f$ means to move or adjust the grapple to its final height $h_f$. To accomplish the above, the program measures the height of the grapple continuously, as suggested in Table I (block 222). It then determines the differential between present position and the intended height (either $h_t$ of $h_f$). It receives an input z-tolerance value $T_Z$ (see Table II) and determines whether the differential falls within the acceptable range of tolerance defined by $T_Z$. If yes, control returns to the main or calling routine according to FIG. 9. On the other hand, if the differential is not within the required range, the program determines whether it is safe to move the grapple 9 in view of its present position and the input safe map. If it is not safe to move, the program stops. Otherwise, it continues by moving the grapple an increment closer to its destination and looping back along indicated path 233 or 309 to measure the new position to which it has just moved. The program continues to loop around until measured position and destination are within the acceptable range defined by tolerance $T_Z$, whereupon the program exits through "return" to its main or calling routine.

The incremental movement of the grapple just described and represented by blocks 232 and 308 in respective charts B and F follows a Hewlett Packard software routine HP308050. This routine insures that the grapple reaches its destination in a criticality damped fashion, without overshoot or overdamping. All movements of bridge 7 and trolley 8 herein are preferably similarly damped by the same HP routine.

Charts C and E will now be discussed together since both relate to moving the trolley 8, even though in chart C the trolley is only moved to the centerline $C_L$, (to prepare for transit through the channel 5, a move which requires minimal precision), whereas in chart E, the trolley 8 must precisely "home in" on its final destinathe output of each position meter is fed to a suitable interface 70. In turn, each of the interfaces 70 leads to a process controller subsystem 71 along a suitable electrical connection or bus 73.

A Hewlett-Packard (HP) 3850A Industrial Distance Meter is suggested for service as bridge and trolley position sensors 15', 15'', and 17. This model can operate in cooperation with reflectors 16', 16'', and 18, which are HP 11410D reflecting targets. A suitable power supply to energize position sensors, for example model HP62012E, is effective to energize the position sensors. A suitable electric connection 74 is made for example by an Opt 850 cable to connect meters 15', 15'', and 17 to respective interfaces 70, which are preferably HP38001A-type interfaces. Since each 3850A Distance Meter ouputs data in a 56-bit serial data format, the interface converts the data into IEEE Standard 488-1978 format. Buses 73 for connection to the process controller subsystem 71 are preferably HP-IB buses.

A suggested grapple position meter 19 is an optical absolute position encoder Model 76 manufactured by Litton Systems. The encoder is mounted adjacent the cable drum 43 as shown in FIG. 2 and is connected to the hoist drum shaft by a chain drive. The output of the encoder is binary coded decimal, which can be interfaced directly to the process controller 71 using a HP 9825 BCD interface.

Figure 7:
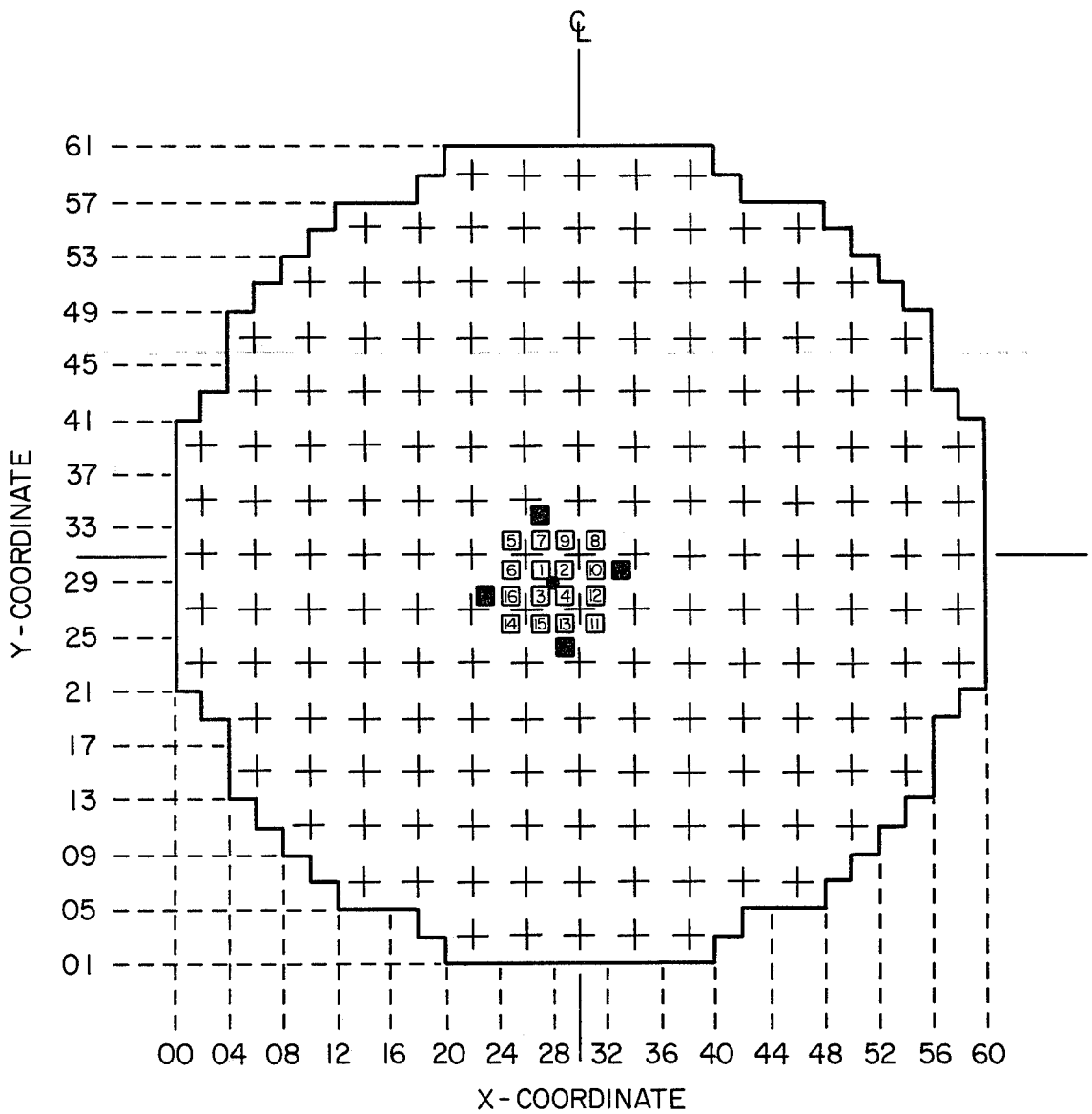
FIG. 7 is a core map setting forth a coordinate scheme for fuel bundle locations in the core.

The process controller subsystem 71 in this embodiment preferably includes for example two HP 9825T computers 75. This insures the timely processing of information from all position sensors and insures sufficient memory capability to accomplish all expected performance and storage requirements. This includes data handling for a safe map and a look-up table for converting input position codes into location coordinates in an x, y coordinate system. Such a look-up table may be based on the core map shown in FIG. 7, in which fuel bundles 11 are indicated by selected numbers. The computers are interconnected by a suitable bus 76, such as for example a HP-IB bus. The connection between bus 76 and the computers 75 is made through suitable interfaces 77, such as for example model 98034A interfaces.

The input buses 73 from the position meter subsystem 71, in each case pass directly to a suitable interface 80 such as for example model HP98034A. The bridge position meters 15' and 15'' are connected to the same interface 80 and share the same computer 75, which outputs digital control signal $S_B$. The HP98034A interfaces 70 leading from trolley and grapple position sensors 17, 19 also share a computer 75 and are connected to separate interfaces 80. One interface 80 provides a control signal $S_T$ for the trolley motor control subsystem; another provides a control signal $S_H$ for the hoist motor control subsystem in FIG. 5, which indicates a generalized motor control subsystem scheme.

FIG. 5 further indicates digital control signals $S_B$, $S_T$, and $S_H$, each independently leading to a suitable digital-to-analog converter 91. This in turn, by suitable electrical connection, leads to the mode switch 37, which is located at the console 36 of the operators cab 33. This switch 37 permits manual closing of relays (not shown) which allow suitable signals from the process controller to access the motor controller 95. Simultaneously, other relays (also not shown) to a suitable manual control point 96 open, resulting in fully automatic control.

The motor controller 95 utilized depends upon the kind of motor employed. In this embodiment for example, the hoist motor 101 is preferably governed by a GE Valutrol TM motor controller, which is energized by facility power 97 (460 VAC, 3 phase, 60 Hz) modified by a suitable transformer 99 such as for example a 3 phase, 60 Hz, 3 KVA, 460/230 VAC step-down transformer. The corresponding preferred hoist motor rating is 2 HP, which enables it to lift up to 1,000 lb. in conjunction with a suitable reduction gear. The hoist motor 10' ranges between 0–1750 RPM during operation and is rated at 240 VDC and 7.1 amps.

Bridge and trolley motors 101 (respectively rated at 1.5 and 0.5 HP) preferably follow a GE Statotrol TM Regenerative Adjustable Speed Drive of the 6VHR Series.

To continue, FIG. 6 shows a top view of the light rays 107 directed toward and reflected from bridge reflectors 16' and 16''. The bridge 7 is one-dimensionally represented as a line between bridge position sensors 15' and 15''. The trolley 8 is represented by an arbitrary x, y position as it travels along the bridge 7. The bridge 7 is shown skewed at an angle theta ($\theta$) which is established by one position meter 15' measuring a distance $y_1$ to reflector 16' suitably mounted on the containment building 2, and the other position sensor 15'' measuring distance $y_2$ to reflector 16'' at another suitable location on the containment building. This skew may for example occur because of irregularities in the level and separation of rails 26 on which the bridge 7 travels. While the sensors 15' and 15'' cast a specifically forward directed ray of light, each beam is broad enough to enable a sufficient portion of the ray to reach its corresponding reflector 16' and 16''.

Employing both bridge position meters 15' and 15'', the following trigonometric relationships hold:

$$b_c = b + |y_1 - y_2|(a/d) \qquad (1)$$

for $y_1 > y_2$;

$$b_c = b - |y_1 - y_2|(a/d) \qquad (2)$$

for $y_2 > y_1$; and $$a_c = (a) \sec (\theta), \qquad (3)$$

where
a is an input trolley destination,
b is an input bridge destination,
$a_c$ is the corrected trolley destination,
$b_c$ is the corrected bridge destination,
d is the separation between bridge position meters,
$y_1$ is the position of sensor 15' on the bridge,
$y_2$ is the position of sensor 15'' on the bridge,
sec ($\theta$) is the secant of the skew angle theta ($\theta$),
$\theta$ is the arctangent of $|y_1 - y_2|$ divided by d, and
$|\ |$ represents the absolute value of the quantity between the bars.

Above relationships (1)–(3) define the process of automatically transferring the loaded or unloaded grapple 9 from a measured position (x, y) to an input destination (a, b) under conditions of skew. This involves moving the bridge 7 to destination "b" until position sensor 15' reaches the new bridge destination "$b_c$". This implies a correction distance $e_y$ for the bridge, which is either added or subtracted from "b". This correction distance $e_y$ follows the relationship:

$$e_y = \pm |y_1 - y_2|(a/d). \qquad (4)$$

tion. Accordingly, chart E includes a subroutine to correct for skew.

Both charts C and E indicate continuous monitoring of trolley position "x" and calculation of the differential between trolley position and destination (which in the case of chart C is the centerline $C_L$). Next, an appropriate tolerance $T_{CL}$ or $T_X$ is introduced. A decision follows as to whether the differential is within the acceptable tolerance range. If yes, control returns to the main routine through the appropriate "return" function. If no, the safety of moving the trolley 8 is determined. If it is unsafe to continue, the program stops. Otherwise, the trolley is moved an increment closer to its destination and the process loops back on the control path indicated in Table I. When the trolley is finally within the range of tolerance, control returns to the main routine. Of course, if trolley 8 moves out of its safe zone in the meantime, the routine immediately stops.

Figure 12:
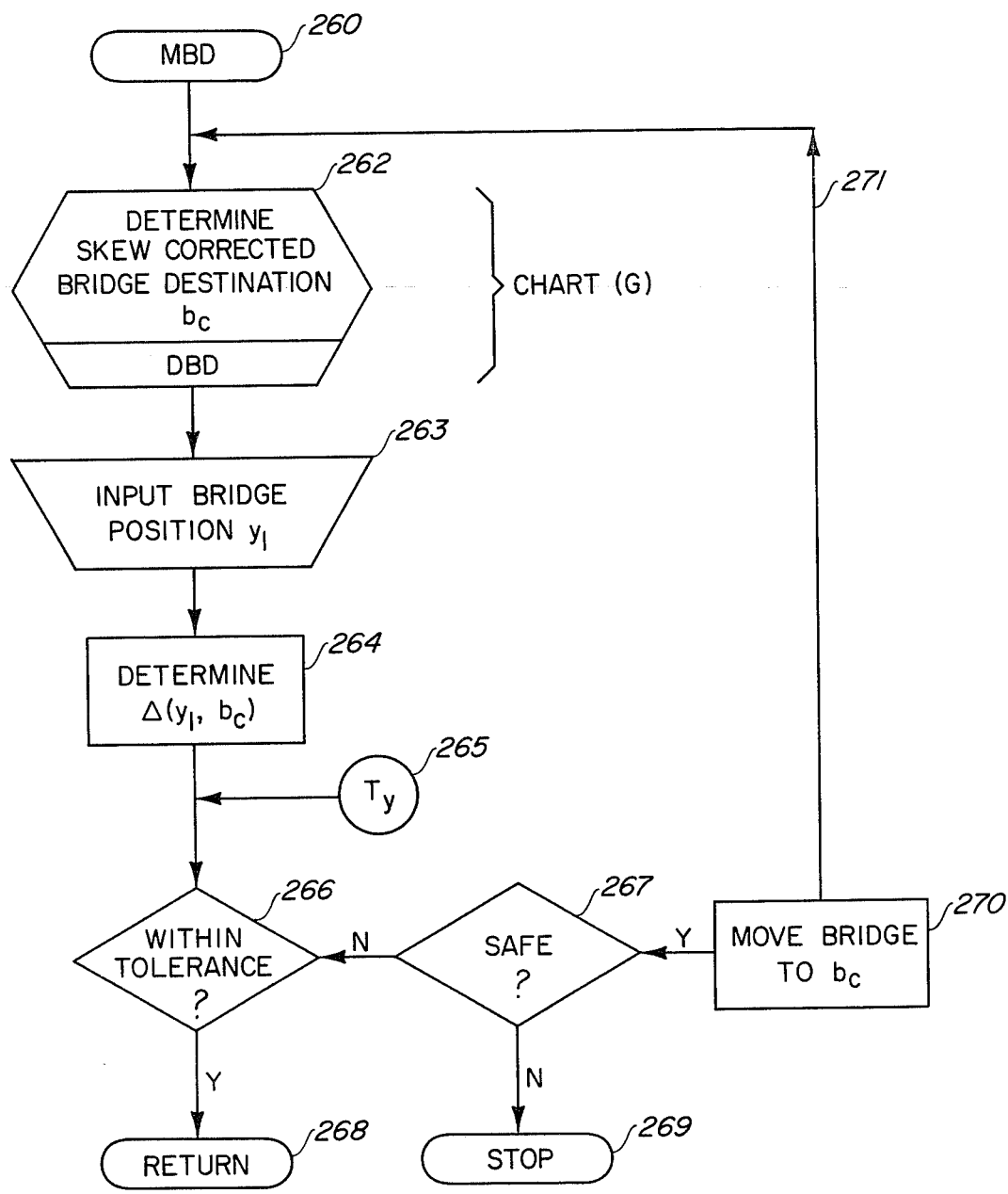
Figure 13:
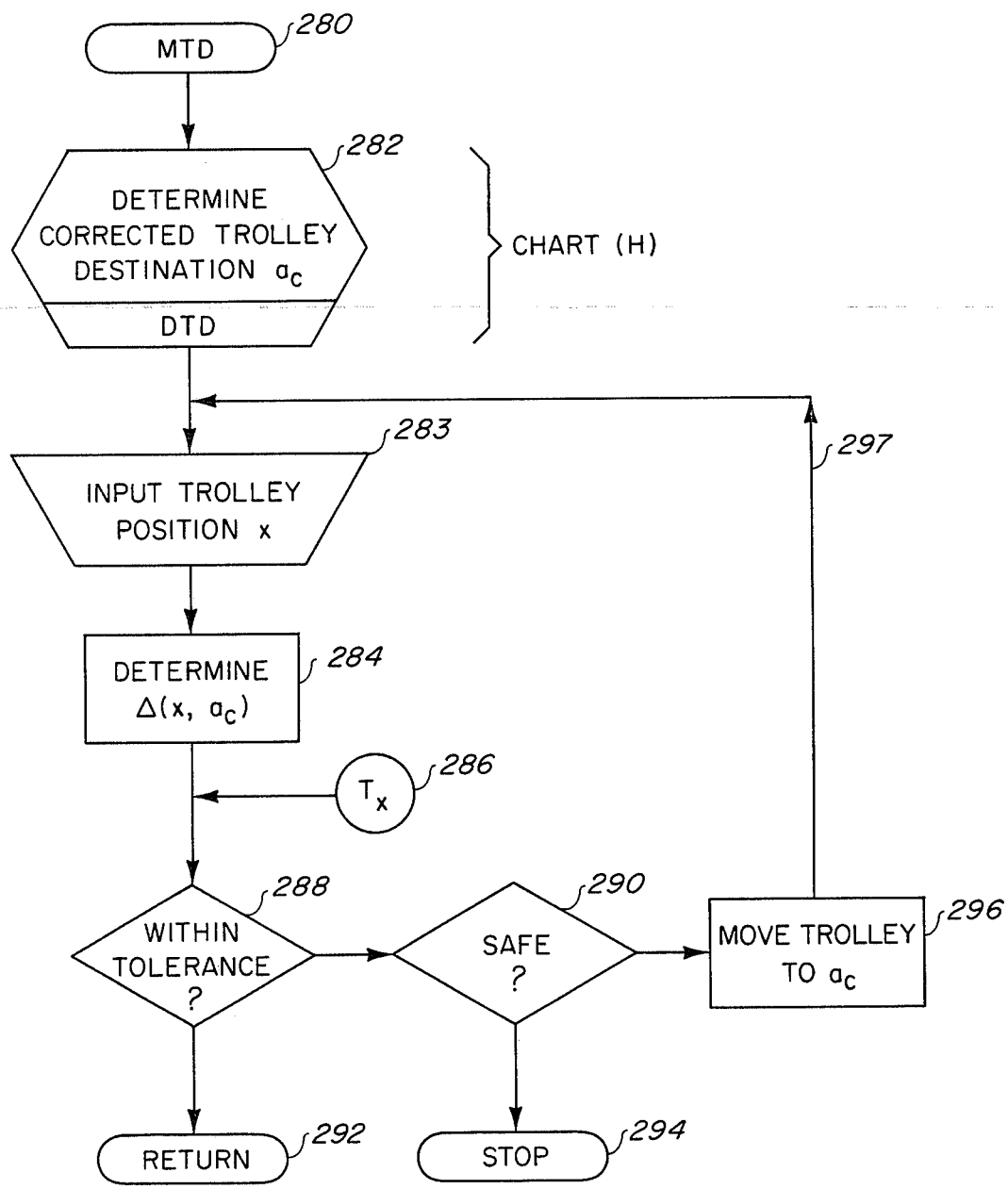
Figure 14:
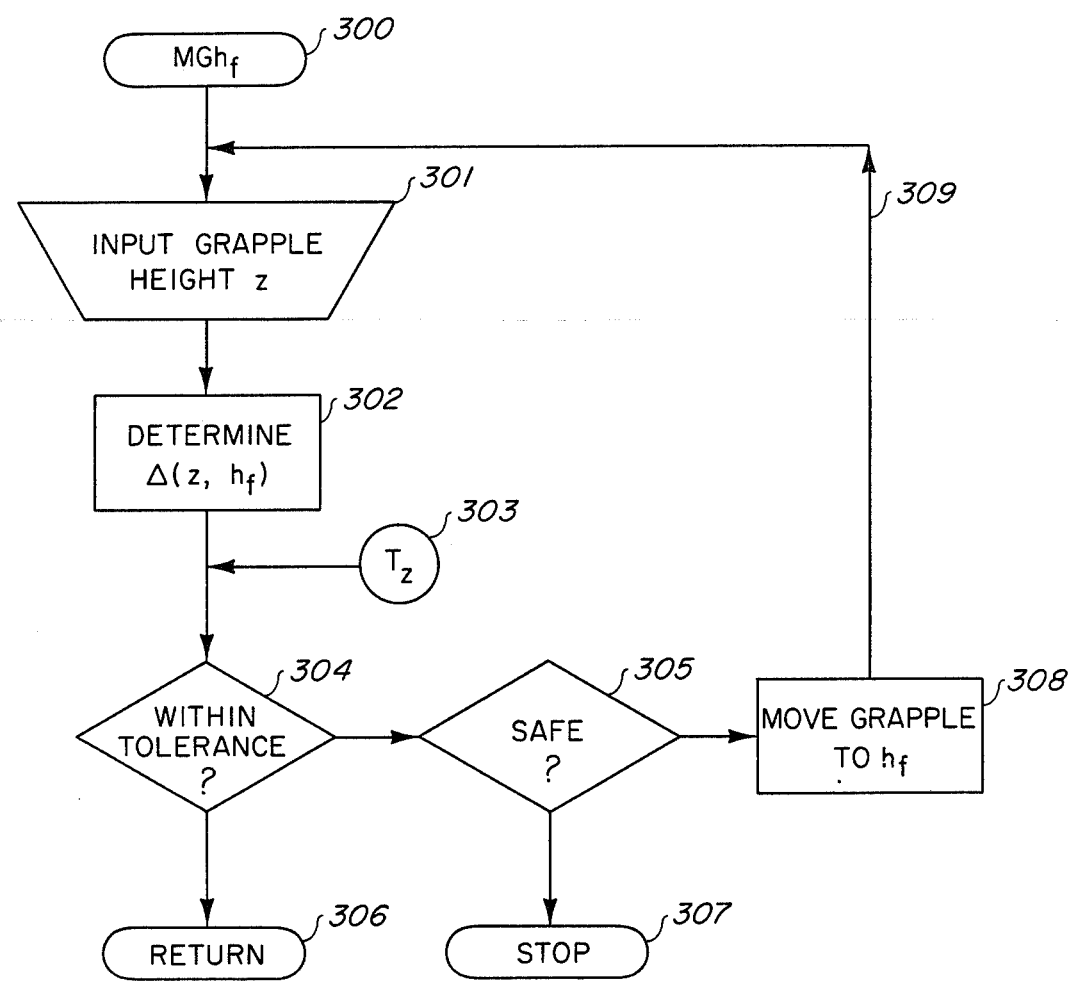
Figure 15:
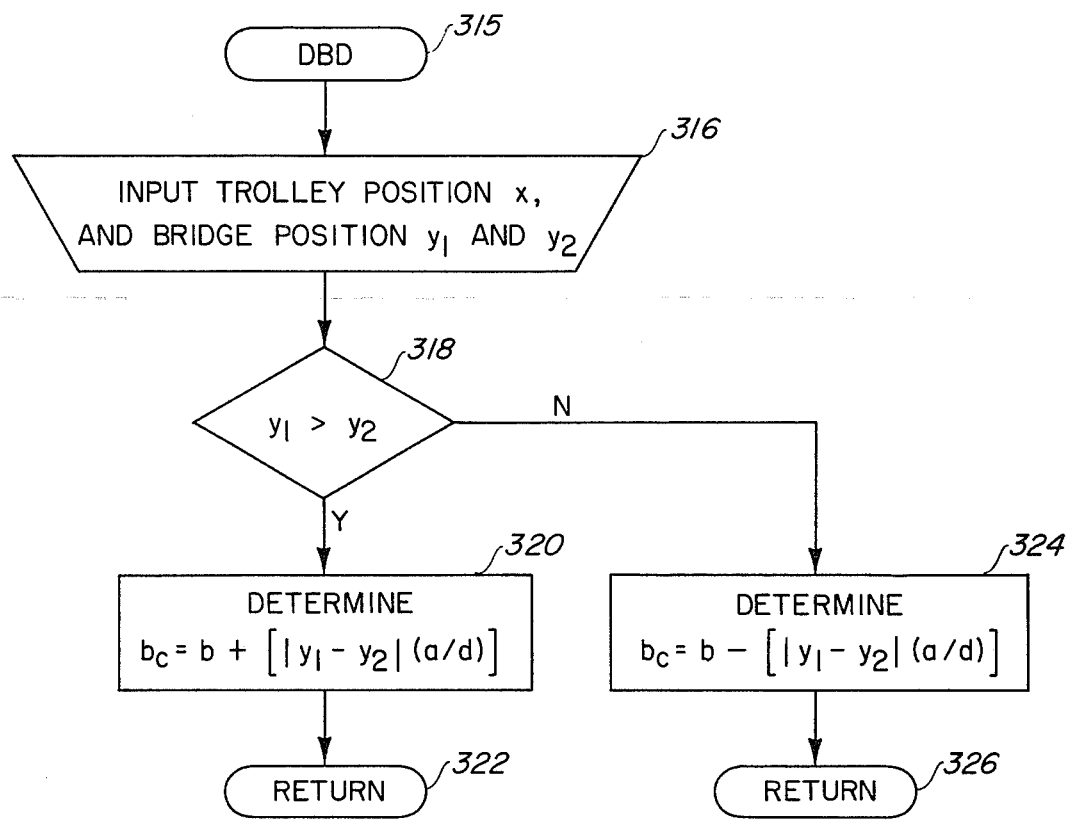
Figure 16:
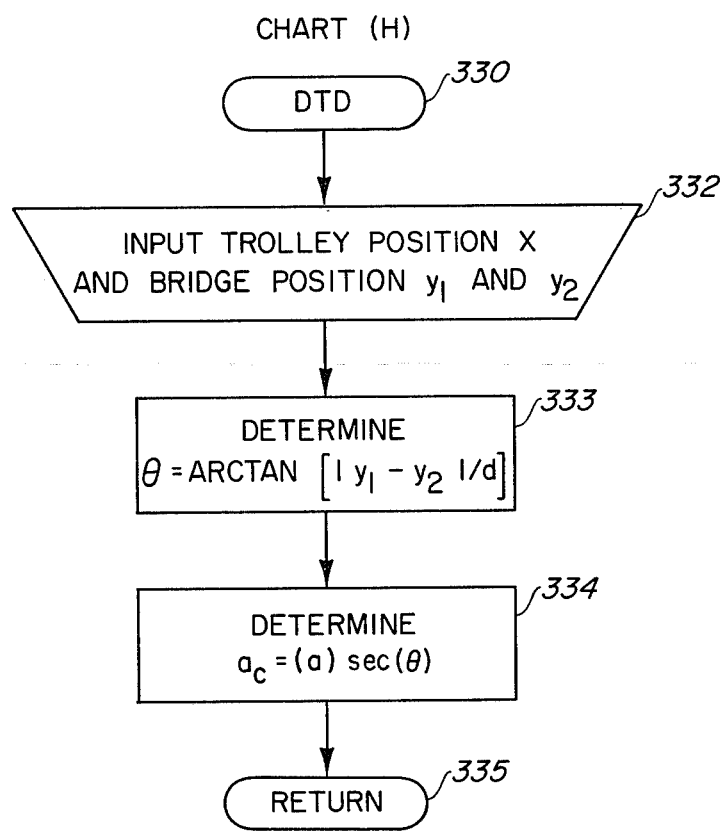

Regarding chart D, which governs bridge movement, and chart E which controls the trolley, both include a feature for skew correction. This is based upon the bridge employing both of its position sensors 15' and 15''. If skew is to be neglected, subroutines DBD and DTD and corresponding blocks 262 (FIG. 12) and 282 (FIG. 13) are omitted and charts G and H are eliminated.

Chart D refers to chart G; chart E, to chart H. As a result of entering the subroutines indicated in charts G and H, new destination values $a_c$ and $b_c$ are developed. More specifically, block 262 produces a new bridge destination value $b_c$; block 282 produces a new trolley destination $a_c$.

After return from subroutine DBC, chart D indicates determination of the difference between present position and destination $b_c$. A tolerance value $T_Y$ is received and a determination is made whether the differential falls within the required range of tolerance. As in prior charts, the program returns to the main routine if the tolerance condition is met. If not, a safety determination for bridge movement is made, with the usual consequences of failure. If movement is safe, the bridge is moved an increment closer to its destination and the loop continues along path 271. Note that this loop requires the bridge destination to be redetermined every computer cycle. This is appropriate because it is not possible to predetermine the effect on skew caused by an incremental movement of the bridge. Thus, the skew must be monitored continuously after the fact while the bridge is in movement. This will not be necessary in chart E, wherein the trolley 8 moves and not the bridge 7.

Turning now to chart E, it is noted that block 282 produces a new trolley destination $a_c$. When the bridge is skewed, movement toward the designation is no longer simply along the x-coordinate axis. Also note that a new trolley destination $a_c$ needs to be determined only once, since skew is now fixed by the bridge remaining stationary.

As before, the routine continually reads trolley position and calculates the differential between position and destination $a_c$. A tolerance value $T_X$ is introduced and a determination is made whether the differential lies within the range of tolerance. A safety determination is made and the same consequences as usual follow. If it is safe to move, the trolley approaches its destination, and the loop continues as shown in chart E.

Chart G outlines the steps to determine the new bridge destination $b_c$. All bridge and trolley positions x, $y_1$, and $y_2$ are input. The separation "d" between the bridge and position sensors 15' and 15'' has already been noted in block 202. A decision block 318 guides the program to the appropriate one of blocks 320 or 324, depending on whether $y_1$ exceeds $y_2$, which is predicated upon which side of the bridge is skewed closer to reflectors 16' and 16''. The program returns to its calling routine through either block 322 or 326.

Chart H outlines the steps followed to determine new trolley destination. All pertinent distances x, $y_1$, and $y_2$ are input. The skew angle theta ($\theta$) is equal to the arctangent of the absolute value of the difference of the quantity $y_1$ and $y_2$ divided by d. Then $a_c = (a) \sec(\theta)$ is determined. The program finally returns to the appropriate block in its calling routine.

By way of an example, the automatic fuel transfer apparatus operates in the following way:

The bridge 7 and trolley 8 begin at some arbitrary location, and the grapple 9 is at an arbitrary height. The operator inputs destination coordinates at a terminal 34 and presses the mode button 37, which initiates automatic operation.

Next, the process controller 71 looks up the destination position corresponding to the input destination coordinate. Simultaneously, the position meters 15' and 15'' determine the present location of the bridge 7, trolley 8, and grapple 9.

If the initial position of the bridge 7, trolley 8, and grapple 9, and the destination position of these structures are on a common side of the channel 5, the grapple 9 adjusts to a travel height and bridge 7 and trolley 8 move directly to the destination position. Upon arrival at the destination, the grapple 9 moves to a preselected final height. If present position and destination are not on common sides of the channel 5, the trolley 8 initially moves to the centerline for passage through the channel 5, and then follows the steps already discussed.

The apparatus can be loaded or unloaded with a fuel bundle 11 in accomplishing the sequence described above. In the loaded case, however, the operator suitably couples the grapple 9 onto the bail 62 of the fuel bundle 11 prior to moving the grapple 9 to its travel height. Furthermore, after the grapple 9 reaches its final height, the operator suitably positions the fuel bundle 11 and uncouples the bail 62. The operator couples or uncouples the fuel bundle 11 from the grapple 9 by opening and closing the hooks 63 with the controls at his disposition in the trolley 8.

The above description pertains to a single possible embodiment of the invention and its variations and is susceptible of reasonable modifications by those skilled in the art. However, this invention is not meant to be limited to the preferred embodiment just shown and described. Rather the claims set forth the inventive concept and are intended to cover all modifications coming within the spirit and scope of the invention described herein.

We claim:

1. Automatic fuel transfer apparatus in the containment structure of a nuclear reactor including a fuel storage pool for storing fuel bundles and a wetwell positioned between a pair of rails, said wetwell surrounding a pressure vessel containing a core for receiving fuel bundles, said containment structure including a channel connecting said storage pool and said wetwell, a refueling platform including a bridge mounted for movement on said rails, said rails being widely spaced whereby the position of said bridge is subject to skew, a trolley mounted on said bridge for lateral movement therealong with respect to said rails and a grapple depending from said trolley for lifting and moving fuel bundles, said apparatus comprising: a first bridge position sensing system mounted at one end of said bridge and communicating directly between said bridge and said containment for providing bridge position indications; a second bridge position sensing system mounted at the other end of said bridge and communicating directly between said bridge and said containment for providing bridge position indications; means responsive to the position indications from said first and second bridge sensing system for providing skew corrected bridge indications of the position of said bridge with respect to said containment structure; a trolley position sensing system communicating directly between said bridge and said trolley for providing trolley position indications of the position of said trolley with respect to said bridge; a grapple position sensing system for providing grapple position indications of the position of said grapple with respect to said trolley; means for determining the present position of said trolley with respect to said containment structure from the skew corrected indications of the position of said bridge and the indications of the position of said trolley; means for comparing said present position with a selected destination position and determining the difference; means for determining whether said difference is within a selected range of tolerance; means for moving said trolley to a position for safe travel through said channel if travel therethrough is required to reach said destination position; and means for moving said bridge and said trolley toward said destination position while periodically comparing present position with destination position until said difference is within said selected range of tolerance.

2. A method of automatically moving the bridge, trolley and grapple of a refueling platform in a nuclear reactor containment structure including a fuel storage pool, a wetwell and a channel joining the two and defining a centerline, said bridge traveling on widely spaced rails whereby the position of said bridge is subject to skew, comprising the steps of:

(1) providing a first bridge position sensing means mounted at one end of said bridge and communicating directly between said bridge and said containment for providing bridge position indications;

(2) providing a second bridge position sensing means mounted at the other end of said bridge and communicating directly between said bridge and said containment for providing bridge position indications;

(3) combining the indications from said first and second bridge position sensing means to provide skew corrected indications of the position of said bridge with respect to said containment;

(4) providing a trolley position sensing means communicating directly between said trolley and said bridge for providing trolley position indications of the position of said trolley with respect to said bridge;

(5) providing a grapple position sensing means for providing grapple position indications of the position of said grapple with respect to said trolley;

(6) adjusting said grapple to a selected travel height;

(7) determining the present position of said bridge and said trolley from said trolley and skew corrected bridge position indications;

(8) comparing said present position with a selected destination position and determining the difference;

(9) determining whether said difference is within a selected range of tolerance;

(10) determining the safety of movement;

(11) moving said trolley to said centerline for movement through said channel;

(12) moving said bridge and said trolley an increment closer to said destination if it is safe to move;

(13) repeating steps (7)–(10) and (12) until said difference falls within said range of tolerance.

* * * * *